March 17, 1970 G. JAY ET AL 3,501,025
BALE STACKING APPARATUS
Filed June 10, 1968 6 Sheets-Sheet 1

FIG. 1

INVENTOR.
GEORGE JAY
EVERETT V. RANKINS

Julian Caplan
ATTORNEYS

March 17, 1970 G. JAY ET AL 3,501,025
BALE STACKING APPARATUS
Filed June 10, 1968 6 Sheets-Sheet 3

INVENTOR.
GEORGE JAY
BY EVERETT V. RANKINS
Julian Caplan
ATTORNEY

March 17, 1970  G. JAY ET AL  3,501,025
BALE STACKING APPARATUS
Filed June 10, 1968  6 Sheets-Sheet 4

INVENTOR.
GEORGE JAY
EVERETT V. RANKINS
BY
Julian Caplan
ATTORNEY

March 17, 1970 G. JAY ET AL 3,501,025
BALE STACKING APPARATUS
Filed June 10, 1968 6 Sheets-Sheet 5

INVENTOR.
GEORGE JAY
EVERETT V. RANKINS
BY
*Julian Caplon*
ATTORNEY

3,501,025
BALE STACKING APPARATUS
George Jay and Everett V. Ranking, both % Jay and Rankins, 602 Merle Lane, Manteca, Calif. 95336
Continuation-in-part of application Ser. No. 569,503, Aug. 1, 1966. This application June 10, 1968, Ser. No. 744,281
Int. Cl. B65g 57/06, 57/22; B60p 1/00
U.S. Cl. 214—6        10 Claims

ABSTRACT OF THE DISCLOSURE

A mobile bale stacking machine provides a frame having a vertically movable elevator platform. Mounted adjacent the front of the machine is an elevator chute which lifts bales from the ground to the top of the machine adjacent one edge of the platform. Means is provided at the top of the machine for transferring the bales from the top of the elevator chute and positioning them in layers on the platform in a pattern. The pattern is unique in that some of the bales in some of the layers are disposed longitudinally of the machine whereas most of the bales are disposed transversely.

---

This application is a continuation-in-part of Ser. No. 569,503, filed Aug. 1, 1966, now Patent No. 3,400,839.

This invention relates to an improved bale stacking apparatus and method. More particularly, the invention relates to a machine which picks up conventional hay bales deposited on the ground by a conventional hay baling machine, arranges them in a stack of a pattern of layers of bales, and may be used to transport the stack to a deposit location, and then discharges the stack, while maintaining the pattern. The pattern is shaped to facilitate subsequent transportation of stacks in conventional highway hay transport trucks. Thus the subsequent restacking required after use of other field stacking machines in order to rearrange the bales in a stable stack for transportation is eliminated in the present invention. Accordingly, the invention also relates to the stack of bales produced in accordance with the apparatus and method.

A principal advantage of the invention is the fact that the machine arranges the bales in a pre-selected pattern of layers. In a preferred form of the invention the horizontal arrangement of each layer is eight feet square and preferably seven layers form the stack. In most of the layers the bales extend in two transverse rows of four bales each, but in some of the layers some of the bales are longitudinally arranged, and the interlocking pattern stabilizes the stack, eliminating the need for subsequent rearrangement.

A further feature of the invention is the fact that the machine is designed to transport a stack of bales picked up in the field to a place of deposit such as the edge of the field adjacent a highway, where the stack is later placed on a truck and transported along the highway. On the other hand, the machine can also be used for transportation over highways.

A further feature of the invention is the fact that the machine may be self-propelled and controlled by one man, thereby reducing the labor presently required in stacking bales and also materially reducing the amount of physical labor required for such purpose.

Another advantage of the invention is the reduction in the amount of movement of the bales as compared with other machines of this general type. Reduction in movement of the bales reduces the likelihood of loosening the bales or the baling wires or scattering the hay. It also reduces loss of nutritional value of leaves which might otherwise be lost.

An important feature of the present invention is the fact that the mechanism which, in some positions in the cycle of operation overhangs the platform, may be retracted. Accordingly, the platform may be raised and the stack discharged at various elevations, such as directly onto the bed of a truck or on top of a stack previously deposited on the ground. Retraction of the mechanism at the top of the machine also provides ready access to the operator in the event that manual corrections of malfunctioning are required and further permits transportation of one extra layer of bales in addition to the normal stack.

A further feature of the invention is the fact that the mechanism for pushing the stack off of the elevator platform moves vertically with the platform and horizontally relative to the platform, thereby providing discharge of the stack at any elevation.

Another feature of the invention is the provision of means for tipping the bales in the lower layer of the stack on edge so that the baling wires are out of contact with the ground. Rusting of the wires during prolonged periods of storage is avoided by such tipping.

A further feature of the invention is the fact that the bales are automatically aligned at their outer edges.

Still another feature of the invention is the provision of means for turning selected bales from transverse to longitudinal position in order to tie the stack together. Operation of the mechanism for performing this operation is simple and requires a minimum of manual control.

A still further feature of the invention is the fact that the outer ends of the bales are automatically squared. This feature of the invention is of considerable advantage in highway transportation since the likelihood of an overhanging load which violates traffic regulations is avoided. Although nominally bales are of uniform length, nevertheless in practice their lengths vary. Unless the sides of each layer of bales are squared, longer bales project relative to the shorter and create hazards. The present invention overcomes such difficulty.

Many additional advantages of the invention result from the fact that the stack pattern (with interlocking bales stabilizing the stack) is established by the apparatus when the bales are initially set in place and there is no need to rearrange the stack at any time, up to the time of consumption.

One such advantage is that if a baling wire breaks in the stack or if a bale is otherwise broken, the other bales hold the hay in place, reducing loss.

Another such advantage is the fact that the stack tends to settle, the weight of superimposed bales causing compression of lower bales in an interlocking pattern which further stabilizes the stack and aids in maintaining the shape of the stack when it is stored, lifted on a truck or transported.

Important nutritional values occur in the practice of the invention. Thus handling of the bales from field to consumer is reduced. This saves leaves and foliage and also insures that only a minimum surface area of each bale is exposed to sun and weather, thereby reducing discoloration and withering.

The foregoing results in uniformity of quality since a package of 56 bales (e.g.) is formed and maintained intact until fed to cattle and the parts of the bales not exposed to atmosphere are maintained unaffected by sun and weather.

It is customary in prior hay handling to stack bales at the edge of a field and maintain the stack intact for 30–45 days while the cure of the hay is completed. Hay balers refer to hay "sweating" during this portion of the curing cycle. If the stack is disturbed in this time period, the "sweat" is "broken" and the hay is less palatable to cattle and its nutritional value is believed to be impaired. The stable stack of the present invention, however, can be transported during the sweating period because lifting and transporting the package or stack does not disturb the bales or enable air to interfere with the sweating process.

The present invention has been developed in the central valley of California where standard alfalfa hay bales are dimensioned 16 x 23 x 48 inches and weigh approximately 125 pounds. The machine hereinafter described stacks either 56 such bales in seven layers of eight bales each, or 60 bales in a stack of twelve bales on the bottom and eight on the other six layers. However, the machine can readily be adapted to handle bales of other dimensions and the number of bales in the stack and arrangement of layers may be varied by adjustment of dimensions of the machine which will readily occur to one skilled in this art.

In the description which follows, the machine is self-propelled. However, the machine may be tractor-drawn and actuated in whole or in part by power take-off from the tractor or a ground wheel.

Other objects of the present invention will become apparent upon reading the following specification and referring to the accompanying drawings in which similar characters of reference represent corresponding parts in each of the several views.

For the purpose of the following description, it will be assumed that the machine is to handle a conventional hay bale 10 formed by conventional baling machines having cross-sectional dimensions of 16" x 23", as determined by the shape of the baling chamber. On the other hand, the lengths of such bales although nominally 48 inches, actually vary because of mechanical imperfections of the length limiting mechanisms of the machine. The bales are held in place by baling wires 19, usually three wires per bale. Such bales are discharged from the tail gate of the machine onto the field with one of the 16" x 48" sides resting on the ground and with the 48" dimension extending longitudinally of the path of travel of the baling machine, which path of travel is the same as that of the instant machine. The present invention picks up and stacks such bales as hereinafter described.

Figure 12:
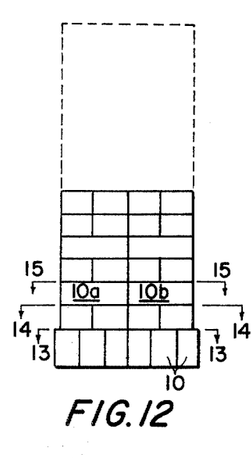
FIG. 12 is a side elevation of a stack formed in accordance with the invention and showing in dotted lines a second stack superimposed on the first.
Figure 13:
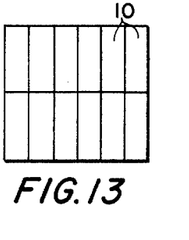
FIGS. 13–15 are plan views of three different layers of stack as viewed substantially along corresponding section lines in FIG. 12.
Figure 14:
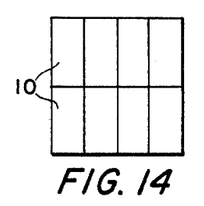
Figure 15:
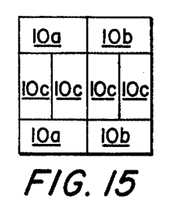

The ultimate pattern of the stack is shown in FIG. 12, although subject to certain variations within the limitations of the present machine. There are seven layers of bales. As hereinafter explained, the bales on the bottom layer optionally may be tilted to rest on their 16" x 48" sides with the wires 19 off the ground, in which case there are preferably twelve bales on the bottom layer in two rows of six bales and a total of sixty bales in the stack. Alternatively, the bottom layer may comprise eight bales resting on their 23" x 48" sides in two rows of four bales, in which case there are 56 bales in the stack. Referring to FIG. 13, the bales of the lowermost layer are tilted to rest on their 16" x 48" faces and the nominal 48" dimension edges extend transversely of the machine so that there are two rows meeting at the longitudinal center line of the machine, and each row consisting of six bales. The second middle and two uppermost layers each consist of eight bales in two transverse rows, each bale resting on one of its 23" x 48" sides, as shown in FIG. 14. The third and fifth layers are shown in FIG. 15. In such layers there are four transverse bales in a row down the center and two longitudinally extending bales at each side. The interlocking of the longitudinally disposed bales in the stack tends to stabilize the stack and reduce any tendency to tip or slide during handling of the stack.

A feature of the arrangement, as hereinafter described, is the fact that the sides of the stack are relatively smooth and straight. As has been mentioned, the bales are only nominally 48 inches in length, but frequently are of shorter length. Where short bales are handled, they are located in the layer with their outer edges flush with the sides of the stack and any gap occasioned by a shorter length of the bale is accommodated by a hollow center. Such hollow does not interfere materially with the formation of the stable stack.

FRAMES AND LOADING PLATFORM

The main frame 21 of the machine has four vertical corner posts 22. The two front posts 22 are interconnected adjacent their lower ends by a horizontal transverse member 23 and at least one horizontal transverse member 24 elevated above the bottom member. At each side is a bottom longitudinal horizontal member 26 which is supported by ground engaging rear wheels 27. A longitudinal side member 28 and cross ties 29 rigidify the sides of the main frame. The back of main frame 21 is open for discharge of the stack.

Forwardly of main frame 21 and rigidly connected to the horizontal member 23 is front frame 36 consisting of longitudinal and transverse members 37, 38 which support engine 39 which provides motive power for the front wheels 41 and also drives a pump (not shown), which energizes the various hydraulic cylinders and motors hereinafter described. An operator's seat 42 is located on frame 21 at the top on the left-hand side of the machine having a steering wheel 43 to turn front wheels 41 and also having a console 44 for a plurality of hydraulic controls conveniently located beside the operator to control energization of the various motors and cylinders.

Normally horizontal and vertically reciprocating bale platform 46 is disposed within the confines of the four corner posts 22. Preferably, each post 22 has an inward facing channel-like track 47, and each corner of platform 46 is provided with a rotatably mounted guide roller 48 which fits into track 47. Platform 46 has horizontal dimensions to accommodate the maximum dimensions of a layer of bales to be handled. A horizontally disposed double-acting hydraulic cylinder 49 is mounted on front frame 36. The forward extending rod 51 of cylinder 49 is provided with four pulleys 52 rotatable on shaft 53. Four cables 57 are fixed to platform 46 by clips 58 and each passes around a pulley 52, and the cables are guided by pulleys 59 disposed on frame 21 so as to pass around top pulleys 61 rotatably mounted at the top of each corner post 22. The ends of the cables 57 are attached to each of the four corners of platform 46. Extension and retraction of rod 51 controls vertical movement of platform 46, and because of the arrangement of the pulleys 59, 61 and cables 57, there is a two-to-one movement.

Figure 3:
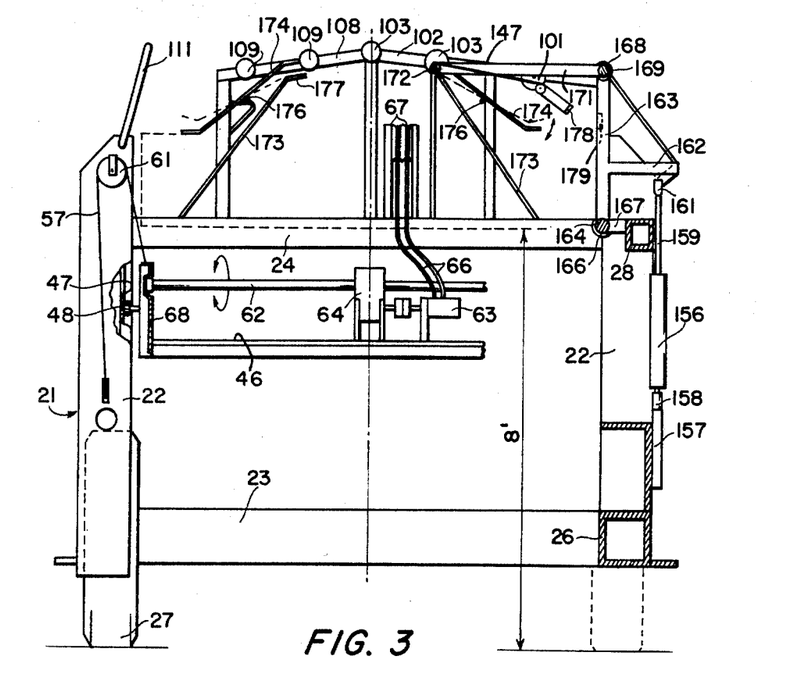
FIG. 3 is a rear elevation partly broken away to reveal internal construction.
Figure 3A:
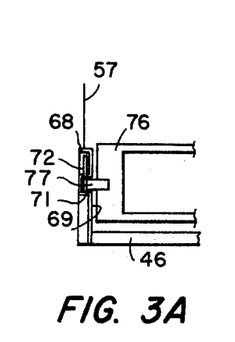
FIG. 3A is a fragmentary view of a portion of the structure of FIG. 3.
Figure 4:
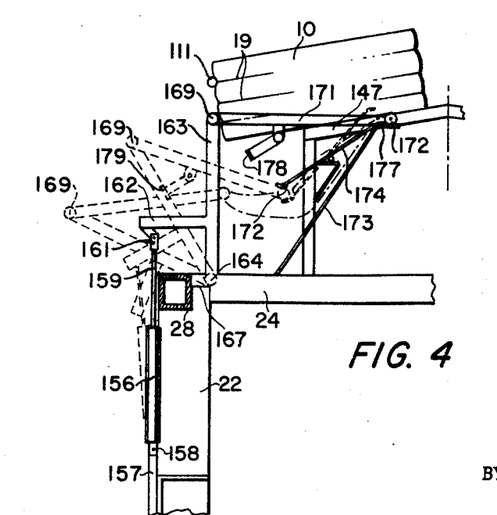
FIG. 4 is a fragmentary, partly schematic view showing portions of the bale edge support actuating mechanisms in different positions of the cycle of operation.

The uppermost elevation of platform 46 is indicated in FIG. 3, and platform 46 is raised to such level for deposit of the first layer of bales (the lowermost layer of the ultimate stack). After the first layer has been deposited, platform 46 is lowered 23 inches (by means of cylinder 49) and the second layer is deposited, and the procedure is repeated until seven layers have been deposited.

After the machine has been transported to the position of deposit and platform 46 moved to the proper elevation, the stack may be discharged. For such purpose there is mounted on elevator platform 46 a transverse shaft 62 driven by a reversible hydraulic motor 63 through gear box 64. The hoses 66 for hydraulic fluid connected to the motor extend up over pulleys 67 adjacent the top of the front of the frame 21 so that the motor may be operated at any elevation. Side members 68 extending longitudinally on either side of platform 46 are provided with longitudinal slots 69 having top and bottom rims 71. Endless chains 72 on either side extend on their bottom stretches at the level of slots 69. On either end of shaft 62 is a drive sprocket 73 around which chain 72 passes and at the opposite end are idler sprockets 74. Mounted transversely above the level of plaform 46 is a pusher 76, the opposite ends of which have extensions 77 extending through slots 69, riding between rims 71 and fixed to chains 72. Accordingly, as motor 63 is driven, pusher 76 is moved forward and backward over the top of platform 46.

As an optional feature, in order to reload a stack already on the ground onto platform 46 truck bed, a transverse horizontal driven roller 81 may be provided along the back edge of platform 46 and turned by means of chains 82 and top and bottom sprockets 83, 84. Sprocket 83 is driven by chain 72 and may be disengaged therefrom if it is not desired to drive roller 81. In this operation, roller 81 and the back end of platform 46 are forced under the edge of the stack as the machine is driven rearwardly. Movement of the machine and rotation of roller 81 feed the stack onto the platform. Thereafter the machine may be driven to another location and the stack discharged.

BALE PICKUP ELEVATOR AND TOP BALE TRANSFER

Bales 10 are deposited by the baling machine in a line at spaced intervals resting on one of their 16″ x 48″ sides. The operator steers the machine along such line so that the right-hand side of the machine encounters the bales in order. Bale pickup chute 85 on the right side of the machine is generally upwardly-rearwardly tilted and held in such position by braces 87 attached to the right front corner post 22.

Chute 85 is rectangular in cross-section and dimensioned to accommodate bales 10. The chute is open at the bottom and has forwardly directed horizontal guides 88 between which the bales are received. The front of chute 85 is provided with transverse horizontal bars 89 at spaced intervals. Mounted on the rear of chute 85 and offset toward the outer edge thereof are vertical chains 91 having spaced lugs 92 which project toward the front. Chains 91 pass around top sprockets 93 mounted on horizontal transverse drive shaft 94 which is driven by hydraulic motor 96. Idler sprockets 97 are located at the bottom of chute 85. As each bale 10 encounters lugs 92, the bale is lifted in chute 85 to the top. The right-hand side of chute 85 is provided with a top turning inwardly curved guide rod 98. Thus as it is lifted to the top of the chute 46 by lugs 82, the bale is tilted inwardly, the inmost top roller 101 serving as a fulcrum.

Roller 101 is rotatably mounted in transverse, upwardly-inwardly slanted, frame 102 for transverse conveyor 100 and spaced inwardly from the outermost layer are two additional rollers 103, all three rollers 101, 103 being power driven by hydraulic motor 104 through drive chain 106 and sprockets 107. On the left-hand side of the machine are downwardly-outwardly slanted extensions 108 of the transverse frame 102 and journalled therein are the ends of two rollers 109 which are not power driven. Hence as a bale is turned from elevator chute 85 into transverse position, it is moved transversely to the left and slightly upwardly toward the center of the machine by rollers 101, 103. Thereupon the next bale in order and also the force of gravity move the previous bale over the idler rollers 109 to left-hand end stop 111, so that there are two bales extending transversely on transverse conveyor 100.

Figure 1:
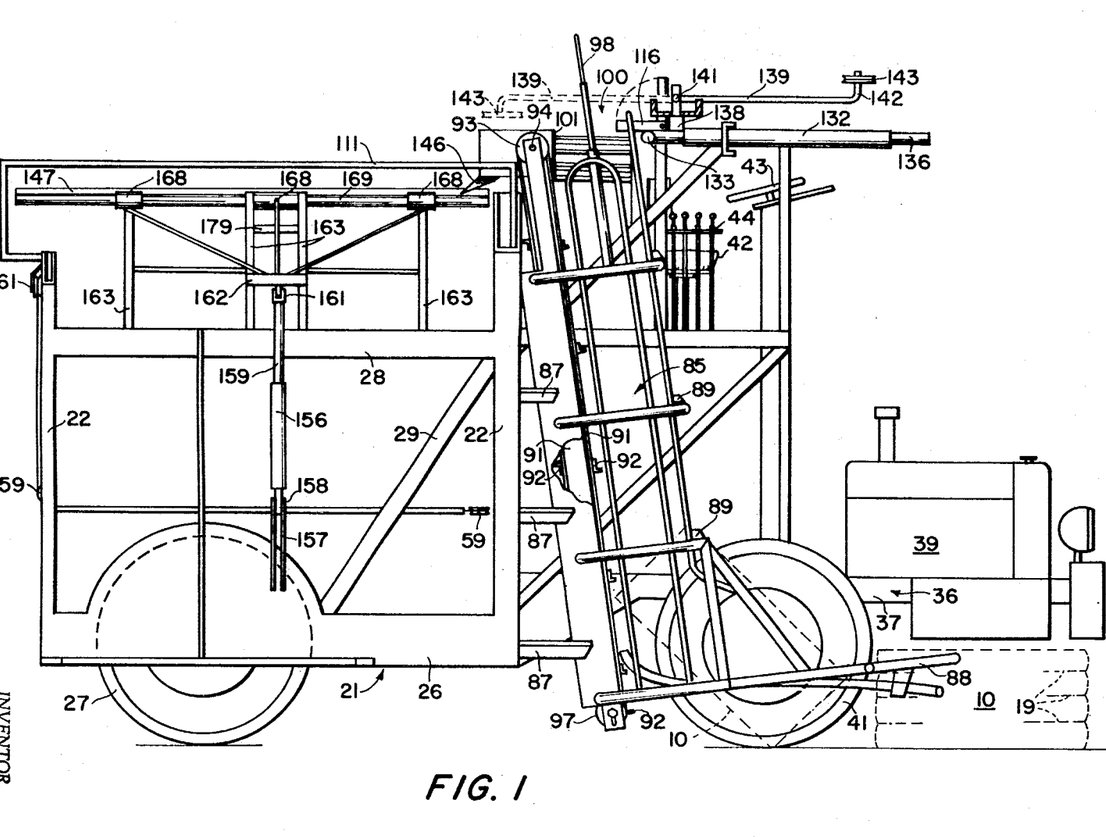
FIG. 1 is a side elevation of the machine.

As is hereinafter explained, in certain of the layers it is desirable to position four transverse bales in the center of the layer. In order to stop the transverse movement of the bales for such positioning, a manually actuated intermediate stop 116 pivoted about a horizontal transverse axis on frame 108 has an operative position (see FIG. 1), which blocks transverse movement of the bale, so that when thus blocked the bale is at the center of the machine. The stop is pivotable upwardly into inoperative position.

Figure 5:
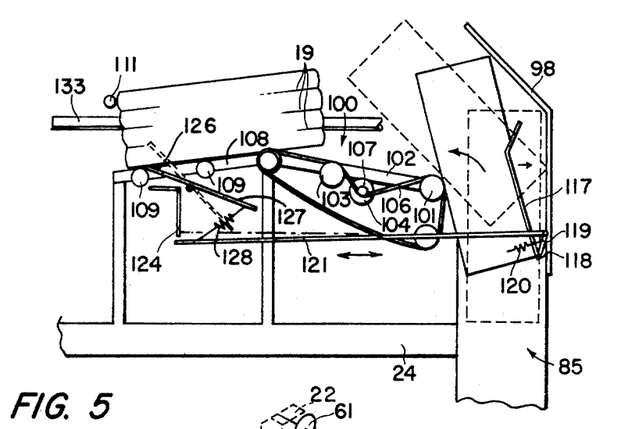
FIG. 5 is a fragmentary sectional view taken substantially along the line 5—5 of FIG. 2.
Figure 5A:
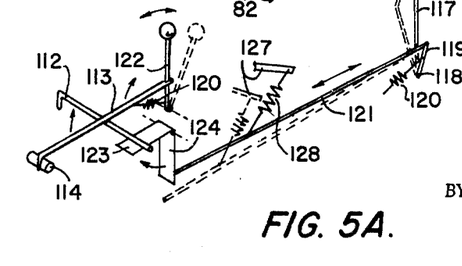
FIG. 5A is a fragmentary, schematic perspective view of the transverse conveyor drive motor control and associated mechanisms.
Figure 6:
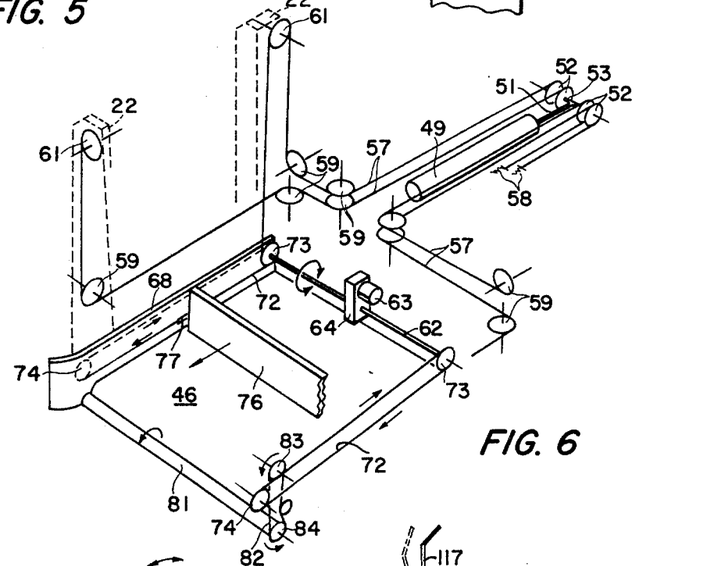
FIG. 6 is a schematic perspective view, with parts broken away, showing the elevator platform and discharge pusher actuating mechanisms.

Positioned adjacent the top of chute 85 is a lever 117 which normally overhangs the chute but which is moved in a clockwise direction as viewed in FIG. 5 by each bale as it reaches the top of the chute. Lever 117 is connected to a shaft 118 carrying a crank arm 119 which is pivotally attached to one end of transverse rod 121. Each time a bale reaches the top of chute 85 it forces lever 117 out of the way—i.e., lever 117 pivots clockwise about shaft 118 as viewed from the rear. The action of gravity and spring 120 return lever 117 to normal position in the path of bales arriving at the top of chute 85.

Valve control lever 122, one of the levers at console 44, controls motor 104 driving rollers 101, 103. Lever 122 has a latch 113 pivoted thereto which engages roller detent 114 on console 44 and when thus engaged lever 122 is held "on" and motor 104 continues to operate. Attached to latch 113 is a horizontal longitudinal bar 112, part of which may be gripped and lifted by the operator to unlatch lever 122 and part of which extend rearwardly above the top, normally horizontal, arm of angular member 123. Member 123 has a downward extension 124 against which the left end of rod 121 when in its "up" position abuts. Rod 121 tends to remain in "down" position, below the level of extension 124.

On the left side of the machine is a hook 126 pivoted to member 108, and one end of hook 126 projects above the level of rollers 109 into the path of the left-hand bale so that when the second bale has moved into the limit of its transverse movement, hook 126 is moved counterclockwise. Lever 127 on hook 126 is connected by spring 128 to rod 121 and thus biases the rod to "up" position.

The operation of this feature is as follows: The operator moves lever 122 to "on" position, latch 113 engaging detent 114, holding the valve controlling motor 104 open and continuously driving rollers 101, 103. Because hook 126 is up (there being no bale on rollers 109), rod 121 is down. When the first bale reaches the top of chute 85, lever 117 pivots out of the way, causing rod 121 to move first to the right and then to the left. Leftward movement is below the level of extension 124, hence lever 122 is not affected. The second bale actuates the mechanism in substantially the same manner except that the second bale pushes the first to the left, pivoting hook 126 counterclockwise and tensioning spring 128. The third bale at the top of chute 85 pivots lever 117 and moves rod 121 to the right. Spring 128 biases rod 121 up so that on the leftward movement of rod 121 its left end engages extension 124, tilting arm 123, raising bar 112 and pivoting latch 113 out of engagement with detent 114, returning lever 122 to "off" position and stopping motor 104 so that the third bale is not fed transversely until the first two bales are moved off the transverse conveyor and hook 126 moves to "up" position, releasing spring 128.

LONGITUDINAL PUSHING MECHANISM

Figure 2:
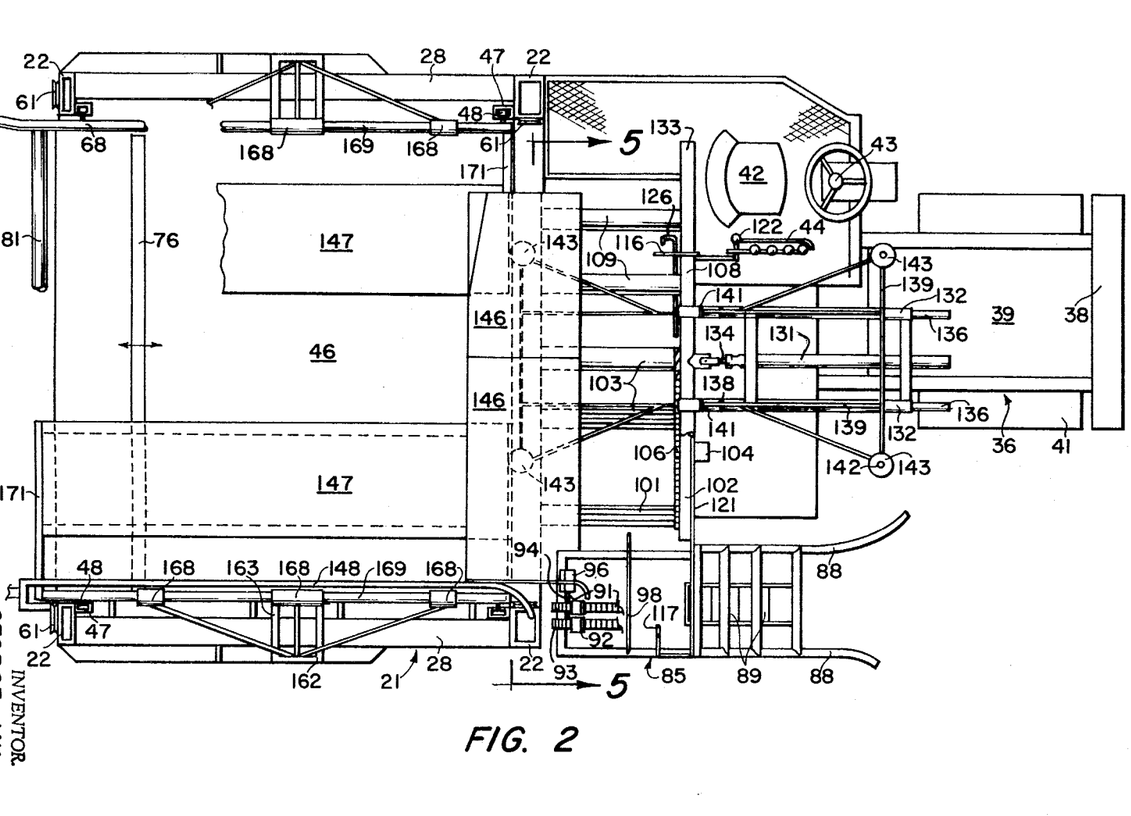
FIG. 2 is a top plan.

Extending horizontally longitudinally forward of the transverse conveyor and slightly above the level thereof is a hydraulic cylinder 131 and parallel thereto at either side thereof are guides 132. Extending transversely horizontally of the machine is a push bar 133 connected to rod 134 of cylinder 131 and also having longitudinal guide rods 136 which slide in guides 132. Fixed to each of the guide rods 136 is a vertical leg 138 and pivotally connected to the two legs is a turning roller subframe 139 which at its end opposite the pivot 141 has legs 142 on the ends of which are rotatable turning rollers 143. The subframe 139 may be swung from its retracted position (solid lines, FIGS. 1 and 2) extending forwardly of push bar 133 to operative position (dotted lines) extending rearwardly of the push bar 133 and when in the latter position turning rollers 143 are horizontally disposed and rotatable about vertical axes and positioned at an elevation about that of the push bar 133. Rollers 143 facilitate turning of the bales for the longitudinal ties, as hereinafter explained.

The principal function of push bar 133 is to push the bales located on the transverse conveyor 100 rearwardly. Immediately rearward of transverse conveyor 100 are left and right aprons 146 which are slanted at the same pitch as the idler and power driven conveyor rollers 101, 103, 109 and are approximately at the same elevation. Thus when the push bar 133 pushes rearwardly, it first pushes the bales onto aprons 146 and then rearwardly of the aprons 146 onto the edge supports 147 which are hereinafter described.

Figure 7:
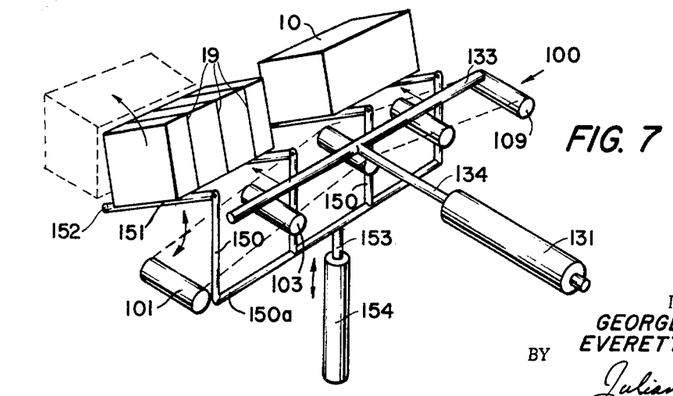
FIG. 7 is a fragmentary perspective showing bale tipping mechanism.

As an optional feature of the invention, it is frequently desirable to tilt the bales in the lowermost layer 90°, so that the baling wires 19 are not resting on the ground and are not damaged by contact with ground moisture. For such function, as best shown in FIG. 7, arms 151 are fixed to transverse shaft 152 and extend between some of the rollers. Pivoted legs 150 are interconnected by horizontal bar 150a connected to rod 153 of cylinder 154. When the cylinder 154 is energized, bars 151 pivot counter-clockwise and raise the forward edges of bales 10 on conveyor 100, tilting the same through an angle of about 45° about their rearward transverse bottom edges as fulcrums. When the bales are tilted into such position (solid line position in FIG. 7), the rearward movement of the pusher bar 133 first completes the tilting of the bales until they rest on their 48" x 16" edges rather than on their 48" x 23" edges. Once the bales are thus tilted, continued rearward movement of the pusher bar 133 pushes the bales longitudinally rearwardly on apron 146 in the same manner as when the bale tilt arms 151 are not used.

BALE EDGE SUPPORTS

Extending longitudinally of the machine rearward of apron 146 and to a position near the rear end of the elevator platform 46 on either side of the machine are bale edge supports 147 which are flat members which in their supporting position are located in the same planes as aprons 146, extending from near the outer edge of platform 46 inwardly a distance slightly greater than one-half the length of each bale. When in supporting position, a bale moved rearwardly off of apron 146 onto support 147 is held thereby tilted downwardly-outwardly. When two bales are thus supported, one on either side, their bottom edges are approximately in contact with each other. To prevent outward sliding of the bales, there are horizontal longitudinal guides 148 which hold the bales from sliding outwardly.

Actuation of supports 147 to move the same from supporting position to retracted position is controlled by a pair of hydraulic cylinders 156, one on each side of the machine. Since each support is similarly actuated and controlled, only one side is described. Cylinder 156 is pivoted at its lower end to side frame extension 157 about a longitudinal horizontal pivot 158. The upper end of rod 159 of cylinder 156 is pivotally connected by pin 161 to outward extension 162 of support frame 163. Support frame 163 includes a longitudinal horizontal rod 164 which is received in sleeves 166 fixed to side frame member 28 by arms 167. The function of cylinder 156 is to pivot the support frame 163 about the axis of rod 164. Frame 163 has a plurality of sleeves 168 at its upper end receiving horizontal longitudinal shaft 169. The outer ends of shaft 169 are connected to crank arms 171 which are fixed to the opposite ends of supports 147.

At the forward end of the machine, support 147 has cam follower roller 172. Mounted stationarily on each side of the machine is fixed cam 173 which slants from the center of the machine downwardly-outwardly. On the retractive movement of supports 147, cylinder 156 is energized to retract the rod 159 causing shaft 169 to swing outwardly and downwardly about rod 164 as an axis. Such movement is transmitted to arm 171 and movement of arm 171, and thus of support 147, is controlled by cam roller 172 following cam 173, so that the inner edge of the support moves downwardly and outwardly while the outer edge of support 147, controlled by pivoting of shaft 169 around rod 164, moves in an arcuate path. Such movement continues until bumper 178 which extends out from support 147 contacts stationary bumper 179 on the side of the machine. Thereafter, movement of support 147 is pivotally downward. The results of this control of the support is that the inner edge of the bale is tilted first inwardly-downwardly and then the support moves out from under the bale so that the two rows of bales first move together and then substantially vertically downwardly. When depressed the height of one layer, supports 147 are retracted outwardly.

On the return of support 147 after the bales have been deposited and platform 46 has been lowered the elevation of one layer, pivoted cam 174 swings by gravity about pivot 176 from the inoperative position to which it is moved by reason of the fact that roller 172 initially fits under the inner end of the movable cam at a commencement of its retractive stroke to opeartive position. Hence the inner edge of the support 147 is moved upwardly in a steeper angle during its projective stroke than on its retractive stroke under the control of the movable cam 174 and the inner edges near the end of their projecting stroke move substantially horizontally, the cam roller resting on the horizontal top 177 of the permanent cam 173 and in effect latching it in place. The support remains in place despite considerable load being imposed thereon until the cylinder is energized for the next retractive stroke of the supports.

OPERATION

At the commencement of operation, platform 46 is elevated to the top of the normal travel. The operator steers the machine by steering wheel 43 along the path of bales left by the baling machine. Ordinarily such bales rest on the ground extending approximately longitudinally on one of their 16" x 48" faces. The operator steers the machine so that the bale enters between the guides 88 and the back end of the bale 10 engages the back of chute 85. Lugs 92 of chains 91 elevate the back end of the bale upwardly and slightly rearwardly until it reaches the top of the chute 85. At this position, guide 98 turns the top of the bale transversely inwardly, the bale pivoting around roller 101 which is located at the top of the inner side of chute 85 and the bale falls resting on rollers 101, 103 slanted slightly upwardly-inwardly transversely of the machine. Rollers 101, 103 are power-driven and the bale is driven to the left. Meanwhile, another bale has been lifted up chute 85 and has been deposited on rollers 101, 103 and its left end pushes the rearward end of the first bale until both bales are located on the transverse conveyor, the first bale resting on the idler rollers 109 and stopped by stop 111, and the second bale resting on the power-driven rollers 101, 103. The control lever 122 for the valve which controls motor 104 driving conveyor 100 is held in "on" position, as has heretofore been explained, until the third bale reaches the top of chute 85 and contacts and moves lever 117 outwardly, causing the lever 122 to be released and de-energizing motor 104.

When it is desired to tip the bales in the bottommost layer 90° so that the baling wires 19 are not in contact with the ground, tilt arms 151 are elevated so that the forward bottom corners of the two bales on transverse conveyor 100 are raised above the level of push rod 133. As push rod 133 is moved rearwardly, it completes the tipping of the two bales and pushes the same rearwardly onto apron 146 and then onto the side edge supports 147 and tilt arms 151 are retracted. The series of operations is repeated five additional times, each bale pushing the preceding ones rearwardly so that the total of twelve bales, six on each side of the machine, is supported on the side edge supports 147.

When all of the bales of any layer are in place, cylinders 156 are energized, causing supports 147 to move to retracted position. As this operation is occurring, the top inner corners of the bales in the opposed rows first contact each other, inasmuch as outward movement of the bales is prevented by the stationary supports 111. This causes the bales to move toward the center and then to move downwardly in horizontal position, being deposited upon the elevator platform 46 (or a preceding layer). The layer deposited is shown in FIG. 13. The platform 46 is then lowered the height of one layer and is ready for deposit of the next layer.

If the sides of the layer are not square, the supports 147 may be moved inward and the support frame members 163 squeeze the bales inward, squaring the sides. After the layer of bales has been lowered, the side edge supports 147 are returned to loading position.

Figure 8:
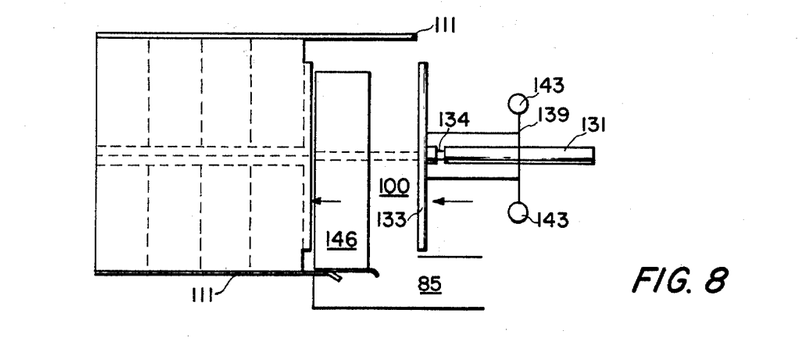
FIGS. 8–11 are schematic plan views, showing sequential operations of portions of the mechanism.

The second layer of bales is formed in substantially the same manner as the first layer, except that the bales are not tilted and only eight bales comprise the layer. The sequence of operations in other respects is similar. The operation is illustrated in FIG. 8. The layer deposited is shown in FIG. 14.

Figure 9:
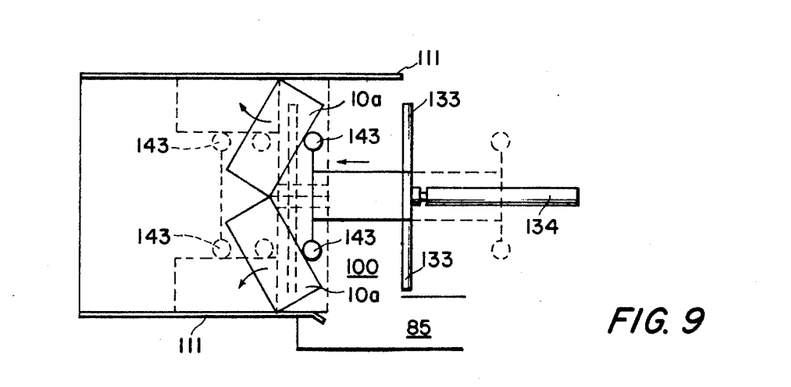

The third layer (FIG. 15) is formed in somewhat different manner. Two bales 10a are fed onto the transverse conveyor 100 in the same manner as has previously been described. The turning roller subframe 139 is then swung into operative position (see FIG. 9) and the push bar 133 is moved rearwardly. Rollers 193 contact the bales 10a and push the bales into longitudinal direction, positioned toward the rear of the side edge supports 147. Subframe 139 is swung back to inoperative position and push bar 133 retracted.

Figure 10:
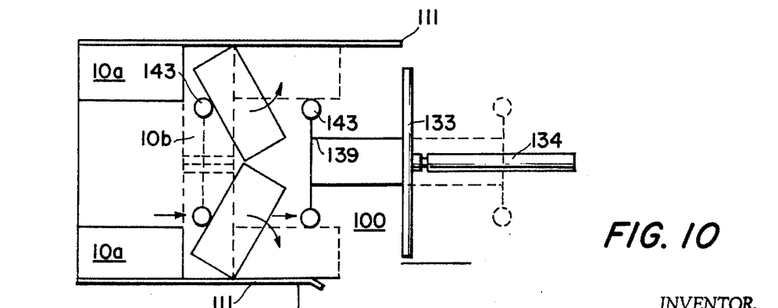

The next step is to position the forward longitudinal tie bales 10b. The next two bales 10b are fed onto the transverse conveyor 100 and pushed by the pusher bar 133 rearwardly (see FIG. 10). Thereupon the bale turning subframe 139 is moved from inoperative to operative position with rollers 143 behind bales 10b and push rod 133 is moved forwardly. As it moves forwardly, the bale turning rollers 143 engage the rear inner corners of bales 10b and pull the same forwardly, causing the bales to swing into longitudinal direction along the sides of the machine. Thereupon subframe 139 is moved to inoperative position and the push bar 133 is moved rearwardly, forcing the two forward tie bales 10b rearwardly and pushing the two rearward tie bales 10a rearwardly to the back end of the machine.

Figure 11:
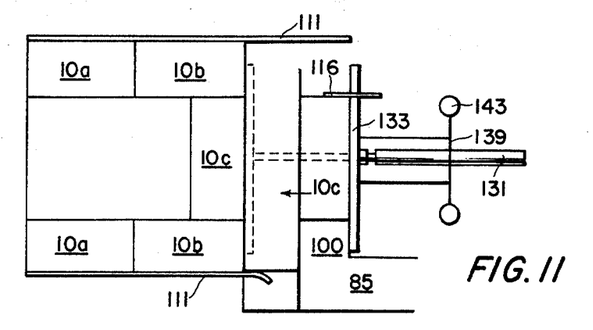

Stop 116 is then moved from inoperative to operative position, causing the next bale 106 on the transverse conveyor to stop at the center of the machine (see FIG. 11). The push bar 133 then pushes bale 10c rearwardly between the longitudinally disposed tie bales 10b with the inner edges of each support 147 supporting one end of bale 10c. This operation is repeated three times, each bale 10c pushing the preceding ones rearwardly, until there are four transversely disposed bales along the center of the machine.

Bale supports 147 are then retracted lowering the third layer of bales on top of the second layer.

The fourth layer of bales is formed in the same manner as the second. The fifth layer of bales is formed in the same manner as the third. The sixth and seventh layers are formed in the same manner as the second.

The complete stack of bales is now in position on elevator platform 46. It consists of a bottom layer (FIG. 13) either eight or twelve bales disposed transversely with either their broad sides or their narrow sides downmost depending upon whether the bottom layer has been tilted. There are eight bales in each of the other six layers. Hence the stack consists of either 56 or 60 bales. The side edges of the stack are squared even though there are irregularities in the length of some of the individual bales. The stack is stabilized by the presence of the longitudinal tie bales 10a, 10b on the outsides of the third and fifth layers which resist any tendency of the stack to tilt.

The machine then moves to the point of deposit. If the stack is to be deposited on the ground, platform 46 is lowered to downmost position and pusher 76 is caused to move rearwardly as the machine moves forwardly forcing the entire stack off the platform and onto the ground.

However, if it is desired to deposit the bales at a higher elevation than the ground, the bale supports 147 are retracted, which opens the entire top of the machine against any obstruction. The elevator platform 46 is then raised to the desired level and pusher 76 energized to push the stack off. This can be done either at the level of the bed of the truck, or at the level of the top of a pre-existing stack (see FIG. 12) so that a second stack may be deposited on top of the first stack.

Roller 81 may be used to feed a deposited stack back onto the platform 46.

What is claimed is:

1. Bale stacking apparatus comprising a frame on a bale wagon, a platform vertically reciprocable in said frame, an elevator chute at the side of the frame having elevating means for engaging bales on the ground and lifting same from the ground to the top of said chute, a transverse conveyor forward of and above said platform and located laterally of the elevator, means for depositing at least one bale received at the top of said chute onto said transverse conveyor extending transversely, a bale edge support pivotally mounted on each side of said frame having a supporting position extending longitudinally behind and about at the level of said transverse conveyor and a retracted position, said supports in supporting position holding a bale above said platform and in retracted position being disposed laterally remote from said platform and longitudinal pushing means forward of said transverse conveyor for moving a bale off said transverse conveyor and onto at least one of said bale edge supports.

2. Apparatus according to claim 1, in which said transverse conveyor accommodates a pair of bales in end-to-end position and said pushing means moves both said bales rearward, one bale onto each said bale edge support.

3. Apparatus according to claim 2, which further comprises means for tilting said bales 90° about a horizontal transverse axis.

4. Apparatus according to claim 1, which further comprises a pusher, guide means on said platform guiding said pusher for reciprocation longitudinally of said platform and means carried by said platform for reciprocating said pusher, whereby a stack of bales may be discharged from said platform at any of a plurality of elevations.

5. Apparatus according to claim 1, which further comprises bale turner means mounted for movement with said longitudinal pushing means and movable between operative and inoperative positions, said bale turner means when in operative position extending rearward of said pushing means and having bale engaging means, said bale engaging means when said bale turner means is in operative position engaging bale disposed transversely on said bale edge supports and turning said bales to longitudinally extending position as said pushing means moves longitudinally.

6. Apparatus according to claim 1, which further comprises drive means for at least a portion of scaid transverse conveyor, drive motor for said drive means, and actuated by movement of bales up said chute and across said transverse conveyor for stopping said drive means when a pair of bales has been deposited on said transverse conveyor.

7. Apparatus according to claim 1, which further comprises drive means for driving at least a portion of said transverse conveyor, a stop mounted on said frame and movable between operative and inoperative positions, said stop when in operative position extending into the path of movement of bales on said transverse conveyor and stopping said bales substantially centrally of said transverse conveyor.

8. Apparatus according to claim 1, which further comprises a cam follower on said bale edge support, a cam on said frame engaged by said cam follower and controlling movement of said support for at least a portion of its travel between supporting and retracted positions, a longitudinal pivot shaft mounted on the side of said frame, a support frame for said side edge supports mounted on said pivot shaft, and power means for pivoting said support frame about said pivot shaft.

9. Apparatus according to claim 8, in which said support frame comprises a first arm pivoted at a first end to said pivot shaft, a second arm, means pivoting said second arm to the end of said first arm opposite said first end, said second arm attached to said bale edge support.

10. Apparatus according to claim 1, which further comprises a transverse apron intermeidate said transverse conveyor and said bale edge supports, said apron being approximately at the level of said transverse conveyor.

References Cited

UNITED STATES PATENTS

| | | | |
|---|---|---|---|
| 2,947,405 | 8/1960 | Fenton | 214—6 X |
| 2,977,002 | 3/1961 | Asp | 214—6 |
| 3,245,557 | 4/1966 | Maramonte et al. | 214—6 |
| 3,429,459 | 2/1969 | Paul et al. | 214—6 |

GERALD M. FORLENZA, Primary Examiner

R. J. SPAR, Assistant Examiner

U.S. Cl. X.R.

214—519